United States Patent
Doerr et al.

(10) Patent No.: US 7,437,075 B2
(45) Date of Patent: Oct. 14, 2008

(54) INTEGRATED RECONFIGURABLE OPTICAL ADD/DROP MULTIPLEXER

(75) Inventors: Christopher Richard Doerr, Middletown, NJ (US); David S Levy, Freehold, NJ (US); Timothy O. Murphy, Fairport, NJ (US); Alice Elizabeth White, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 587 days.

(21) Appl. No.: 10/228,800

(22) Filed: Aug. 27, 2002

(65) Prior Publication Data

US 2004/0042795 A1 Mar. 4, 2004

(51) Int. Cl.
H04J 14/02 (2006.01)

(52) U.S. Cl. .............................. 398/83; 398/45; 398/82
(58) Field of Classification Search ............. 398/45–57, 398/82–83; 385/14–17
See application file for complete search history.

(56) References Cited

U.S. PATENT DOCUMENTS

| | | | |
|---|---|---|---|
| 5,778,118 A * | 7/1998 | Sridhar | 385/24 |
| 6,192,172 B1 * | 2/2001 | Fatehi et al. | 385/17 |
| 6,208,443 B1 * | 3/2001 | Liu et al. | 398/9 |
| 6,429,974 B1 * | 8/2002 | Thomas et al. | 359/618 |
| 6,504,963 B1 * | 1/2003 | Fang et al. | 385/16 |
| 6,674,966 B1 * | 1/2004 | Koonen | 398/70 |
| 6,768,827 B2 * | 7/2004 | Yoo | 385/14 |
| 6,868,201 B1 * | 3/2005 | Johnson et al. | 385/24 |
| 2004/0208576 A1 * | 10/2004 | Kinoshita et al. | 398/83 |

OTHER PUBLICATIONS

U.S. Appl. No. 10/035,628, filed Nov. 1, 2001, C. R. Doerr.

* cited by examiner

Primary Examiner—Dzung D Tran (57) ABSTRACT

An integrated reconfigurable planar lightwave add-drop (RP-LAD) multiplexer for use in a WDM optical communication system is arranged such that each drop port can receive any wavelength channel and each add port can transmit on any wavelength channel. Drop port reconfigurability is achieved by integrating a cross-connect functionality into the RPLAD, illustratively using optical 1×2 switches to perform "space" switching. The switches are controlled from a remotely located node controller. Add port reconfigurability is achieved by having tunable lasers and a wavelength independent optical power combiner, which may be a star coupler that is integrated with the other above-mentioned elements. The RPLAD has a modular architecture, so that when RPLAD's are connected by dual unidirectional transmission rings for the purpose of redundancy and failure protection, an RPLAD that fails can be removed and the remaining module can be reconfigured so as to re-route incoming traffic backwards around the still operating optical communication ring.

8 Claims, 6 Drawing Sheets

INTEGRATED RECONFIGURABLE OPTICAL ADD/DROP MULTIPLEXER

TECHNICAL FIELD

The present invention relates generally to optical communications, and more particularly to an arrangement and architecture for a reconfigurable, integrated optical add/drop multiplexer suitable for use in a wavelength division multiplexed (WDM) optical communication system.

BACKGROUND OF THE INVENTION

Optical networks traditionally consist of a collection of static, inter-nodal communication links located on a ring or mesh. In such a network, network nodes include (a) transmitters having multiplexers (MUX's) that combine multiple channels with different wavelengths into a combined WDM optical signal that is transmitted to remote nodes on the network, as well as (b) receivers having demultiplexers (DMUX's) that recover individual wavelength channels from previously multiplexed WDM optical signals received from remote nodes on the network. The transmitters and receivers typically operate at fixed central frequencies, and the MUX's and DMUX's traditionally have fiber port connections that require pre-assigned wavelengths that cannot be varied. Reconfiguring such networks in order to create (or tear down) connections between nodes typically requires human intervention. For example, a technician may need to add or remove equipment (e.g. transmitters) and rearrange fiber connections to various optical components (e.g. MUX's or DMUX's) at one or more nodes.

One approach to achieve reconfigurability involves the use of optical add/drop multiplexers (OADM's) that can be remotely controlled in order to add or drop an optical signal to a client, and selectively pass an optical signal (of a specific optical wavelength) through the node without being affected. The various major components in such OADM's currently can be obtained in various discrete technologies. For example, 2×2 switches as well as optical cross-connects (OXC's) can be made of thermo-optic, electro-optic, or micro-electro-mechanical systems (MEMS). The MUX's/DMUX's can be made of multi-layer dielectric filters, arrayed waveguide gratings, or bulk-optic diffraction gratings. Unfortunately, building OADMs out of discrete components is very expensive, and many of these discrete technologies are not well suited for integrated fabrication.

A recent improvement in the OXC component of an OADM is described in patent application entitled "Integrated Wavelength Router", Ser. No. 10/035,628 filed Nov. 1, 2001, on behalf of Christopher R. Doerr, which application is assigned to the same assignee as the present application, and which is hereby incorporated herein by reference. In the aforementioned application, a 1×K wavelength-selective cross connect (WSC) comprises a demultiplexer arranged to receive an input WDM signal containing multiple wavelengths, and apply its output, namely, the separated the wavelengths, to a binary tree, i.e., at least two stages, of interconnected 1×2 switches. The switches are integrated, and have their outputs crossing each other at each stage. The outputs of the switches in the final stage are applied to, and combined in, K multiplexers, which provide the outputs of the router. If desired, a set of shutters can be interposed in the waveguides leading to the multiplexer inputs, thereby providing additional isolation. The Doerr arrangement advantageously can be fabricated in a small area and therefore implemented in an integrated fashion.

Notwithstanding the foregoing, other elements of the OADM have not, to date, been arranged in an integrated architecture, so that the remote reconfiguration functionality that is desired has not been achieved.

SUMMARY OF THE INVENTION

In accordance with the present invention, a reconfigurable planar lightwave add-drop (RPLAD) multiplexer is arranged so that it can be fabricated in an integrated manner. The add-drop multiplexer design is novel in that it exhibits true reconfigurability for both the dropped and added channels. By "true" reconfigurability, we mean that each drop port can receive any wavelength channel and each add port can transmit on any wavelength channel. The drop port reconfigurability is achieved by integrating a cross-connect functionality into the RPLAD, in order to achieve an active spatial routing capability. The cross connect is operated under the control of a remotely located node controller. The add port reconfigurability is achieved using passive power collection, such as by having tunable lasers and a wavelength independent optical power combiner or multiplexer.

All of this is enabled by using different techniques to perform the add and drop functions of the multiplexer. With respect to drop channels, optical 1×2 switches, interposed in each wavelength channel, control which channels are "through" channels and which channels are "drop" channels. In order to route the wavelength on each channel to a particular desired receiver, an optical cross connect (OXC), which operates as a "space" switch, is used. By way of contrast, with respect to the add channels, tunable lasers are used in the transmitters to generate optical signals at desired specific wavelengths. The individual channels are then combined in a multiplexer, which may be a star coupler that is also integrated with the other above-mentioned elements.

In accordance with another aspect of the present invention, the RPLAD arrangement of the present invention is also novel in that it is advantageously designed in a modular architecture, which is advantageous when the RPLAD's are connected by dual transmission rings that operate in both East-to-West (CCW) and West-to-East (CW) directions, for the purpose of redundancy and failure protection. Specifically, the RPLAD includes identical CW and CCW modules, each of which contain a channel-dropping cross connect switch for one direction plus an add power combiner for the opposite direction. Each of the RPLAD's is arranged to add channels to one of the transmission rings and to drop channels from the other one of the rings. Thus, if one of the modules in an RPLAD unit fails, it can be removed and the remaining module can be reconfigured so as to re-route incoming traffic on one of the optical communication rings backwards around the other optical communication ring. This combination of the channel dropping capability for one direction of traffic and the channel adding capability for the other direction of traffic in the same RPLAD unit makes the RPLAD unit behavior, in the event of a failure, the same as a fiber cut occurring adjacent to the node, which behavior the failure protection arrangement is well-designed to handle.

In accordance with yet another aspect of the present invention, level balancing, which corrects for imbalances in the power levels present in different WDM channels, brought about, for example, due to unwanted differences in gain or loss in individual channels, is achieved by appropriately controlling variable optical attenuators (VOA's) that are advantageously integrated into the RPLAD units.

In accordance with yet another aspect of the present invention, interleavers or multi-dielectric bandsplitters, are provided at each network node, in order to divide a large number of wavelength channels into smaller, more manageable groups. More specifically, the overall optical spectrum is divided into smaller bandwidth segments, each segment accommodating a group of WDM channels and being handled by an individual RPLAD. Advantageously, the interleavers can also be integrated in the same optical device that contains the other components previously described.

By virtue of the present invention, the manually intensive reconfiguration process normally associated with an add/drop multiplexer is avoided in a remotely reconfigurable optical node that can be fabricated in integrated form. The node includes transmitters with user-selectable optical center frequencies as well as optical cross-connects that can be configured to connect specific user-selectable channels having different optical wavelengths, to (or from) the line system to (or from) the correct port on the MUX (or DMUX). This wavelength or channel reconfigurability enabled by the present invention is especially crucial in the planning and maintenance of networks that have a high degree of churn in network connectivity amongst clients who may have signals of different bit rate and/or protocol.

BRIEF DESCRIPTION OF THE DRAWINGS

The present invention will be more fully appreciated by consideration of the following detailed description, which should be read in light of the drawing in which.

DETAILED DESCRIPTION

Figure 1:
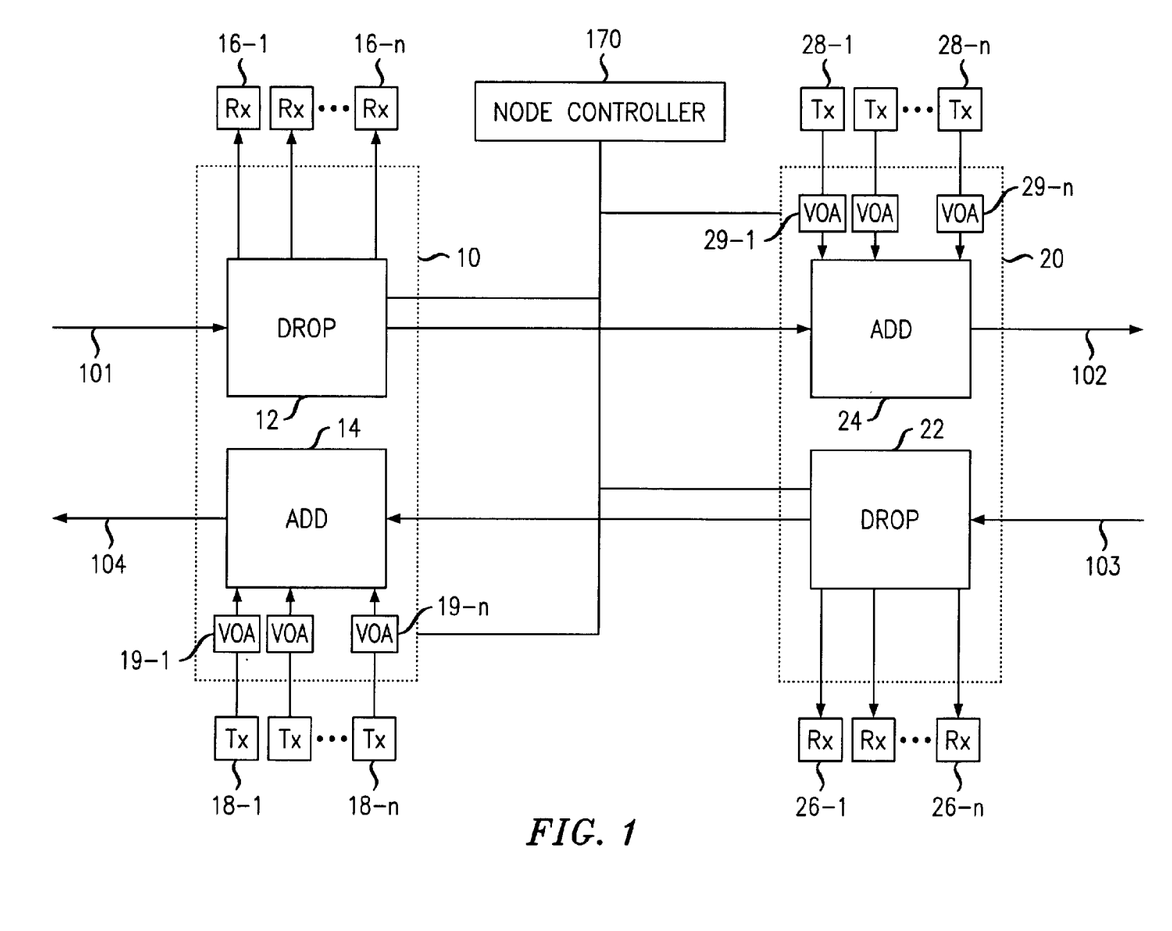
FIG. 1 is a block diagram of the arrangement of a reconfigurable planar add-drop (RPLAD) multiplexer arranged in accordance with the present invention.

Referring first to FIG. 1, there is shown a block diagram of a reconfigurable planar add-drop (RPLAD) multiplexer arranged in accordance with the present invention. Two identical RPLADs 10 and 20 are shown, the former being designated the West RPLAD and the latter the East RPLAD, for reference purposes. Each RPLAD 10, 20 includes a drop portion 12, 22 and an add portion 14, 24 that advantageously, in accordance with the present invention, are integrated on a single optical substrate, respectively. RPLADs 10 and 20 are connected to each other and are also each connected to two WDM optical transmission links, e.g. a west to east link that enters drop portion 12 in RPLAD 10 via fiber 101 carrying a plurality of WDM channels. Drop portion 12 is arranged to selectively output ("drop") desired channels to particular receivers 16-1 to 16-$n$, under the control of a remotely located node controller 170. Drop portion 12 is so designed such that any channel on 101 can be dropped to any receiver chosen by the node controller. Also, the dropped channels are not necessarily terminated immediately at a receiver and may instead enter another optical network. The remaining WDM channels are coupled to add portion 24 in RPLAD 20, which is arranged to input or "add" desired channels applied via transmitters 28-1 to 28-$n$, to the WDM signal, which is then output in the east direction via fiber 102. A series of variable optical attenuators (VOA's) 29-1 to 29-$n$, may be included in RPLAD 20 to adjust the levels of the signals applied by transmitters 28-1 to 28-$n$, respectively. VOA's 29-1 to 29-$n$ may also be operated under the control of node controller 170.

In the opposite (east to west) direction, operation is similar to that just described. Multiple WDM channels enter RPLAD 20 via fiber 103. Dropped channels are applied to receivers 26-1 to 26-$n$ via drop portion 22, controlled also by node controller 170. Added channels input from transmitters 18-1 to 18-$n$ are applied, optionally via VOA's 19-1 to 19-$n$, to the WDM signal via add portion 14, and are output in the west direction via fiber 104.

Figure 2:
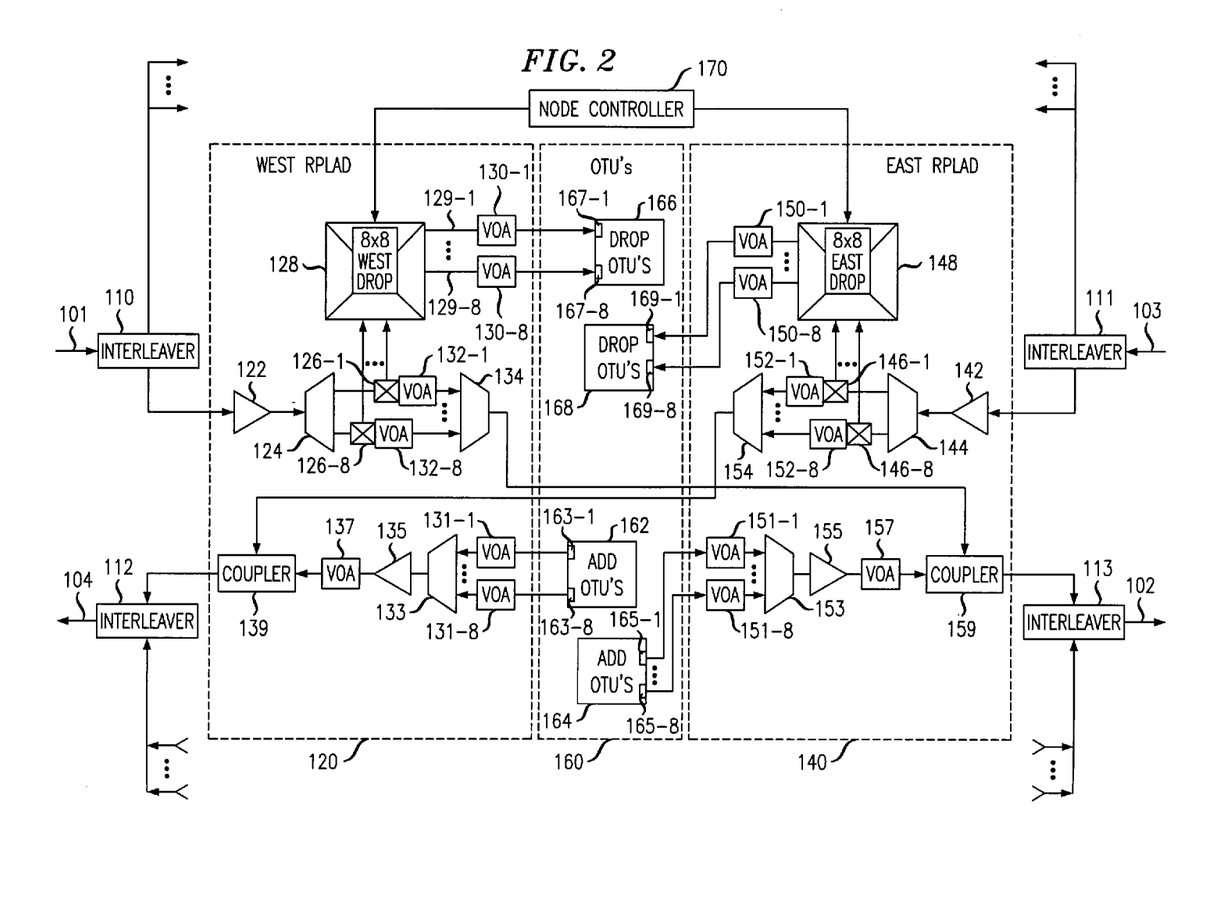
FIG. 2 is a block diagram illustrating further details of an embodiment of the invention, arranged using the architecture shown in FIG. 1.

Referring now to FIG. 2, further details of the arrangement of a node in a WDM optical communication system that includes a reconfigurable planar add-drop multiplexer (RPLAD) arranged in accordance with the present invention, are shown. It is again assumed that the node of FIG. 2 is interconnected with other similar nodes in the same bi-directional optical communication system as shown in FIG. 1, such that the node is part of a first west-to-east optical transmission system that enters the node via fiber 101 and exits via fiber 102, and a second east-to-west optical transmission system that enters the node via fiber 103 and exits via fiber 104. Again, each of the fibers is arranged to carry multiple WDM wavelength channels, illustratively 32 channels.

The eastbound channels enter the node via a west entrance interleaver 110, which, divides the channels into multiple groups each containing multiple WDM channels, and applies each channel group to a respective west RPLAD 120, only one of which is shown in FIG. 2. (In an illustrative example, the incoming WDM signal on fiber 101 contains 32 wavelength channels; this signal is divided into four groups of eight wavelength channels, one group of eight channels is applied to RPLAD 120 and the three groups of channels are applied to three other west RPLAD's not shown in FIG. 2.) Likewise, the westbound channels enter the node via an east entrance interleaver 111, which similarly divides the channels into multiple groups, illustratively four groups of eight channels, and applies each channel group to a respective east RPLAD 140, only one of which is shown in FIG. 2. (In the illustrative example of four groups of eight wavelength channels, three other east RPLAD's would be included.) Note that the wavelength channels in each group are preferably not adjacent in terms of wavelength, but rather are dispersed among the several groups, thereby providing better channel separation and the desired interleaving function.

The eastbound multiplexed optical signal may, if desired, be amplified in an optional amplifier 122 before being applied to a demultiplexer 124. As will be described more fully hereinafter, demultiplexer 124, together with many of the other components in FIG. 2, are integrated on a single optical substrate, and are part of the arrangement described in the above-mentioned co-pending application filed on behalf of Doerr.

Demultiplexer 124 separates the individual wavelength channels in the incoming signal, and in the illustrative case of eight wavelength channels, applies each channel to a respective 1×2 optical switch 126-1 through 126-8, which operates under the control of a node controller 170. If a particular wavelength channel is to be dropped, the appropriate switch 126-1 through 126-8 is controlled to route that channel to an input of optical cross connect 128, which is illustratively configured in an 8×8 arrangement to handle up to eight wavelength channels. On the other hand, if a particular wavelength channel is not to be dropped, it is then considered to be a "through" channel, which is coupled to a multiplexer 134 via a corresponding variable optical attenuator 132-1 through 132-8. The purpose of these attenuators is to provide suitable level balancing, in order to correct for imbalances in the power levels present in different WDM channels. These imbalances may be brought about, for example, by unwanted differences in gain or loss in individual channels that occur in various portions of the optical transmission system.

The dropped channels are processed in cross-connect 128 in a manner such that any particular input wavelength channel (output from any of switches 126-1 through 126-8) may be routed to any desired output line 129-1 through 129-8 of cross-connect 128, under the control of control signals generated in node controller 170. This programmability is necessary because the outputs on lines 129-1 through 129-8 are coupled to individual receivers 167-1 through 167-8 in drop optical translator units (OTU's) 160, and these receivers each are designed to operate at a different, predetermined frequency. Thus, due to the programmability of cross-connect 128, the appropriate wavelength channel can be applied to each of the receivers, and it is not necessary for a technician to manually reconfigure the receivers. Additional VOA's 130-1 to 130-8 are provided in the path between optical cross connect 128 and receivers 167-1 to 167-8, again to provide a level balancing capability.

In addition to drop OTU's 160, the arrangement of FIG. 2 includes a second set of drop OTU's 168, which perform the same functions as OTU's 160, but with respect to wavelengths proceeding westbound on optical transmission medium 103 rather than eastbound on transmission medium 101. Furthermore, the arrangement of FIG. 2 also includes two add OTU sets 162 and 164, which are arranged to add or insert wavelength channels onto the optical transmission mediums 104 and 102 proceeding westbound and eastbound, respectively.

The through channels, as stated previously, are level adjusted in VOA's 132-1 through 132-8 and combined in multiplexer 134, before being applied to one input of a coupler 159. The second input to the coupler represents the add channels that originate in ones of the transmitters 165-1 through 165-8 in add OTU's 164. These wavelength channels are level adjusted in respective VOA's 151-1 through 151-8 before being combined in a multiplexer 153, which may advantageously be a star coupler. The output of multiplexer 153, which is a WDM signal, may be level adjusted by optional amplifier 155 and optional VOA 157, before being applied to the second input to coupler 159. The output of that coupler represents both the through and add channels, and is applied to the eastbound optical transmission medium 102 via east egress interleaver 113, which combines the group of channels processed in the RPLAD of FIG. 2 with other channel groups processed in other RPLADS, not shown.

The arrangement just described is replicated in the node of FIG. 2 such that similar elements to those just described operate in the east to west direction. Specifically, east RPLAD 140 includes an optional amplifier 142 similar to amplifier 122, a demultiplexer 144 similar to demultiplexer 124, 1×2 switches 146-1 through 146-8 similar to switches 126-1 through 126-8, a cross connect 148 similar to cross connect 128, VOA's 152-1 through 152-8 similar to VOA's 132-1 through 132-8, VOA's 150-1 through 150-8 similar to VOA's 130-1 through 130-8, and multiplexer 154 similar to multiplexer 134. The drop channels are applied to appropriate receivers 169-1 through 169-8 on drop OTU's 168, while the through channels are applied to a first input to coupler 139.

The add channels for the eastbound direction are also arranged in a similar manner to that already described with respect to the westbound direction. Specifically, transmitters 163-1 through 163-8 in add OTU 162 are coupled to VOA's 131-1 through 131-8, which are similar to VOA's 151-1 through 151-8, already described. The outputs of VOA's 131-1 through 131-8 are combined in multiplexer 133, level adjusted in optional amplifier 135 and VOA 137, and applied to the second input of coupler 139. The output of coupler 139 is applied to the westbound optical transmission channel 104 via west egress interleaver 112.

Figure 3:
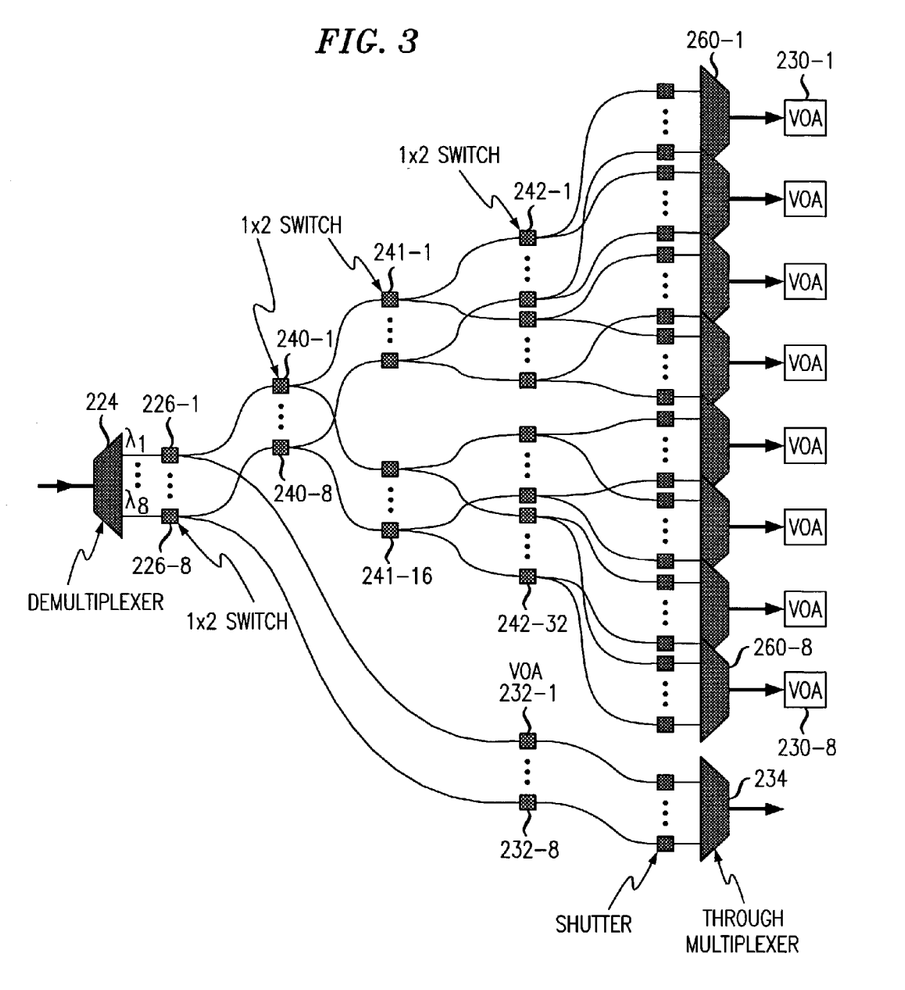
FIG. 3 is a block diagram illustrating in yet more detail a possible embodiment of certain elements of FIGS. 1 and 2, for example, demultiplexer 124, 1×2 switches 126-1 through 126-8, optical cross connect 128, VOA's 132-1 through 132-8, and multiplexer 134, which may be integrated on a single optical substrate.

Referring now to FIG. 3, there is shown a block diagram illustrating in still more detail a possible embodiment of the arrangement of certain elements of FIGS. 1 and 2, for example, demultiplexer 124, 1×2 switches 126-1 through 126-8, optical cross connect 128, VOA's 132-1 through 132-8, and multiplexer 134, which may be integrated on a single optical substrate. This arrangement is called a "wavelength-selective crossconnect" and is contemplated and explained more fully in the above-mentioned co-pending application filed on behalf of Doerr.

Specifically, in FIG. 3, an integratable 1×9 wavelength-selective cross-connect includes a demultiplexer 224 (which corresponds to demultiplexer 124 of FIG. 1), which receives a composite input WDM signal and separates the individual wavelength channels, which are output to 1×2 switches 226-1 through 226-8 (which correspond to switches 126-1 through 126-8 of FIG. 2). If any of these switches are in the "down" position, the wavelength channels are designated as through channels, and the switch outputs are combined in multiplexer 234 (which corresponds to multiplexer 134 of FIG. 2). Variable optical attenuators (VOA's) 232-1 through 232-8, which correspond to VOA's 132-1 through 132-8 of FIG. 2, are interposed in each optical path, for the purpose of providing desired level balancing.

If any of the switches 126-1 through 126-8 are in the "up" position, the wavelength channels are designated as drop channels, and the switch outputs are applied to a three level tree of binary (1×2) switches. The first level consists of one group of eight switches 240-1 through 240-8, the second level consists of two groups each of eight switches, switches 241-1 through 241-16, and the third level consists of four groups each of eight switches, switches 242-1 through 242-32. Collectively, the three switch groups 240, 241 and 242, together with multiplexers 260-1 through 260-8, perform the functions of OXC 128 of FIG. 2, in that any desired wavelength can, depending upon the position of the switches in the three groups, be routed to any of the multiplexers, and be available at any of desired receiver 167-1 through 167-8 in OTU 166. The positions of the switches are controlled by node controller 170, possibly indirectly by a secondary controller inside the RPLAD circuit pack. VOA's 230-1 through 230-8 correspond to VOA's 130-1 through 130-8 of FIG. 2, and provide level balancing in the signals provided to the receivers.

As explained in the co-pending Doerr application cited above, in order to reduce optical crosstalk encountered in the binary tree that is primarily due to unwanted power transfer in waveguide crossover junctions, optical shutters 270-1 through 270-32 can be inserted in each optical path. Node controller 170 is then arranged to close the shutter in any path that is not carrying an active wavelength channel.

Figure 4:
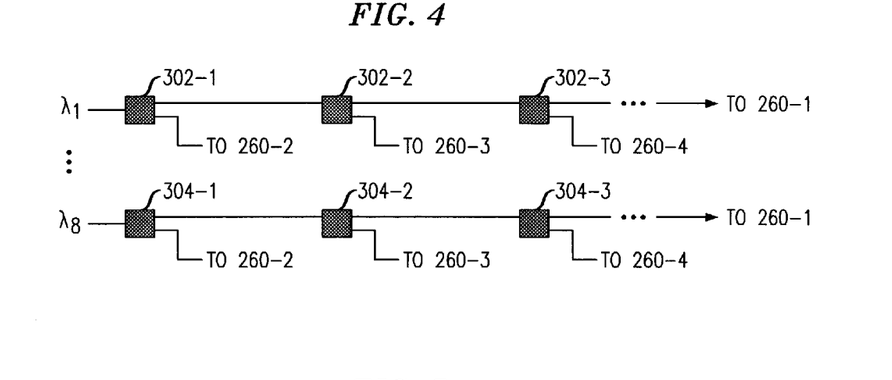
FIG. 4 is a diagram illustrating an alternate arrangement for the cross-connect portion of the RPLAD of FIGS. 1 and 2.

The three-level tree of binary (1×2) switches 240, 241 and 242 shown in FIG. 3 may be replaced, if desired, by a different arrangement of 1×2 switches as shown in FIG. 4. Here, each wavelength channel, illustratively having eight wavelengths $\lambda_1$ to $\lambda_8$, is applied to a separate series connected string of seven 1×2 switches, such as switches 302-1, 302-2 and 302-3 in a first string, and switches 304-1, 304-2 and 304-3 in a string string, each of which switches has one output connected to the next switch and one output connected to a different one of the multiplexers 260-1 through 260-7. One of the outputs of the last switch in the string is also connected to multiplexer 260-8. Depending upon the position of the switches 302, the optical signal at wavelength $\lambda_1$ can thus be directed to a desired one of the multiplexers. In a similar manner, additional strings of switches (such as switches 304) are arranged to connect the remaining wavelengths $\lambda_2$ to $\lambda_8$, to the desired multiplexers 260-1 through 260-7.

Figure 5:
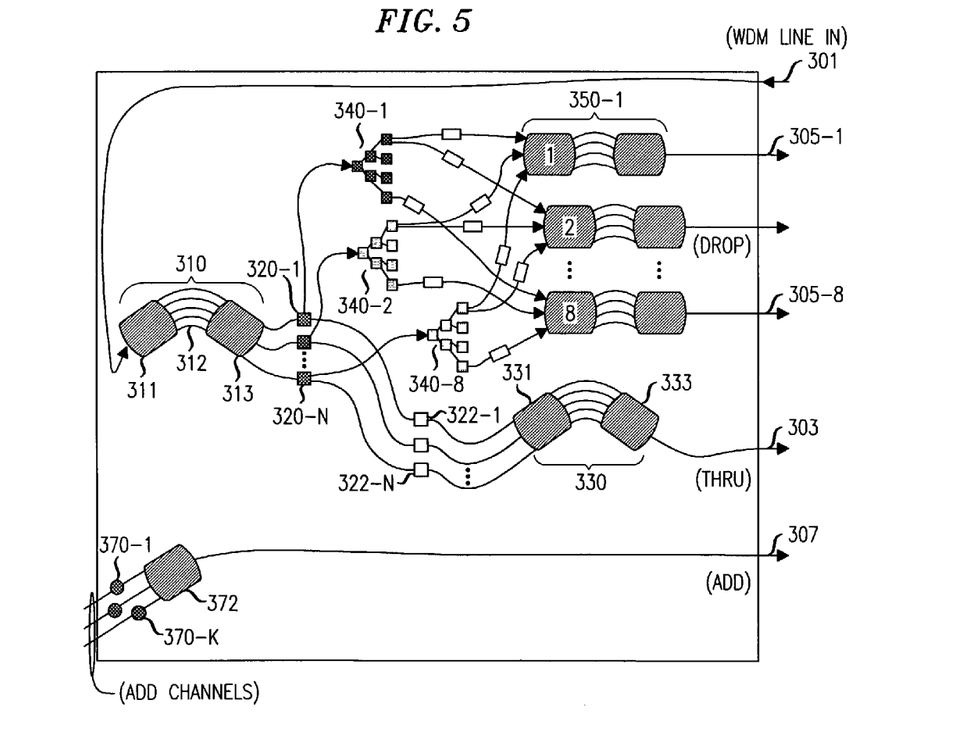
FIG. 5 is a diagram of portions of the add-drop multiplexer of FIGS. 1 and 2, showing schematically the arrangement of elements as they would be fabricated in an integrated RPLAD device.

Referring now to FIG. 5, there is shown a diagram of portions of the add-drop multiplexer of FIGS. 1 and 2, showing schematically the arrangement of elements as they would be fabricated in an integrated RPLAD device in accordance with the possible embodiment of FIG. 3. Advantageously, in FIG. 5, the WDM input to the RPLAD is received on line 301, and the through, drop and add outputs 303, 305-1 to 305-n and 307, respectively, are all arranged to be physically located on the same (e.g., right) side of the device. (Note that n is an arbitrary integer, representing the total number of possible dropped channels. For the purposes of illustration, it is again assumed that n=8.) The input WDM signal is applied to a demultiplexer 310 consisting of star couplers 311 and 313 interconnected by waveguides in accordance with the arrangement described in the above-referenced application to Doerr. The individual wavelength channels output from demultiplexer 310 are each then applied to a first group of 1×2 switches 320-1 to 320-n, which routes the through channels through shutters 322-1 to 322-n to a multiplexer 330 consisting of star couplers 331 and 333 interconnected by waveguides. The outputs of switches 320-1 to 320-n can also be directed to switch groups 340-1 to 340-n, and thence to a desired one of the multiplexers 350-1 to 350-n, which again each consist of star couplers 351 and 353 interconnected by waveguides. Shutters 360 can be interposed in the input to each of the multiplexers, in order to reduce unwanted crosstalk.

In the add channel, the arrangement is simpler. The individual wavelength channels to be added are applied to respective VOA's 370-1 to 370-k, and then combined in a single star coupler 372 that operates as a wavelength independent optical power combiner. (Note that k is an arbitrary integer, representing the total number of possible added channels.)

Several key points are to be noted in connection with the arrangement of FIG. 5. First, it will be appreciated that the majority of the elements in FIG. 5 correspond to the elements of FIG. 2, and thus provide the desired functions via an integrated, easily fabricated optical device. Specifically, using west RPLAD 120 as an example, the input optical signal on line 301 corresponds to the signal applied to demultiplexer 124; the output drop signals on outputs 305-1 to 305-n correspond to the outputs on lines 129-1 to 129-8 in FIG. 2; the through output 303 corresponds to the output of multiplexer 134 of FIG. 2; and the add output 307 corresponds to the output of multiplexer 133. Several of the remaining elements shown in FIG. 2 would be considered "off-chip", and include, for example, RPLAD 120, amplifiers 122 and 135. Second, it is to be noted that different arrangements are used with respect to the add and drop channels. The optical cross connect, which is implemented by appropriately controlling switches 340, operates as a "space" switch. Accordingly, the drop function is performed by active spatial routing. On the other hand, with respect to the add channels, tunable lasers are used in the transmitters to generate optical signals at desired specific wavelengths, and the individual channels are then combined in star coupler 372. This aspect of the RPLAD therefore operates in the "frequency" (wavelength) domain. It can therefore also be said that the add function is performed by passive power collection.

Figure 6:
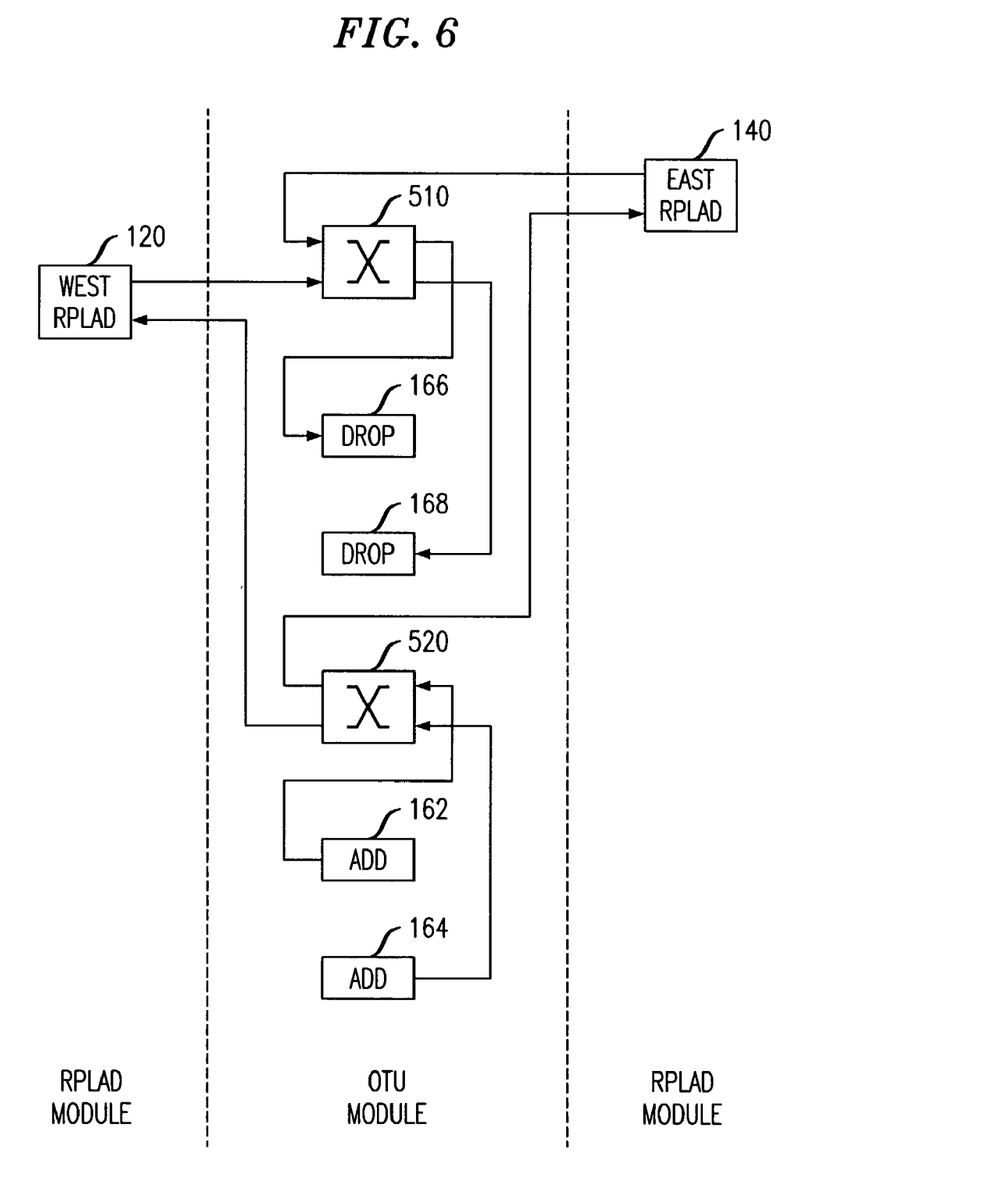
FIG. 6 is a diagram illustrating the manner in which the present invention provides modularity that is useful in reacting to faults that may occur in the optical transmission links connecting WDM add-drop nodes.

Referring now to FIG. 6, there is shown a diagram illustrating the manner in which the present invention provides modularity that is useful in reacting to faults that may occur in the optical transmission links connecting WDM add-drop nodes. West RPLAD 120 and east RPLAD 140, shown in FIG. 6, are internally the same as shown in FIG. 2. Each of these RPLAD's is identical to the other, and normally functions in a similar manner when both the east-to-west and west-to-east optical paths are operating properly. In FIG. 6, OTU module 160 of FIG. 2 also includes a pair of 2×2 optical switches, 510 and 520, that are not shown in FIG. 2. These switches are interconnected with drop OTU's 166, 168 and ADD OTU's 162, 164, respectively, in such a manner that (a) the signals normally applied from cross connect 105 in west RPLAD 120 to drop OTU 166 can be re-routed to drop OTU 168 by the switching action of switch 510, (b) the signals normally applied from cross connect 148 in east RPLAD 140 to drop OTU 168 can be re-routed to drop OTU 166 by the switching action of switch 510, (c) the signals normally applied from add OTU 162 to VOA's 131 and multiplexer 133 in west RPLAD 120 can be re-routed to VOA's 151 and multiplexer 153 in east RPLAD 140 by the switching action of switch 520, and (d) the signals normally applied from add OTU 164 to VOA's 151 and multiplexer 153 in east RPLAD 140 can be re-routed to VOA's 131 and multiplexer 133 in west RPLAD 120. In this manner, if one of the optical transmission links is out of service, communications using the remaining optical transmission link can nevertheless continue.

Figure 7:
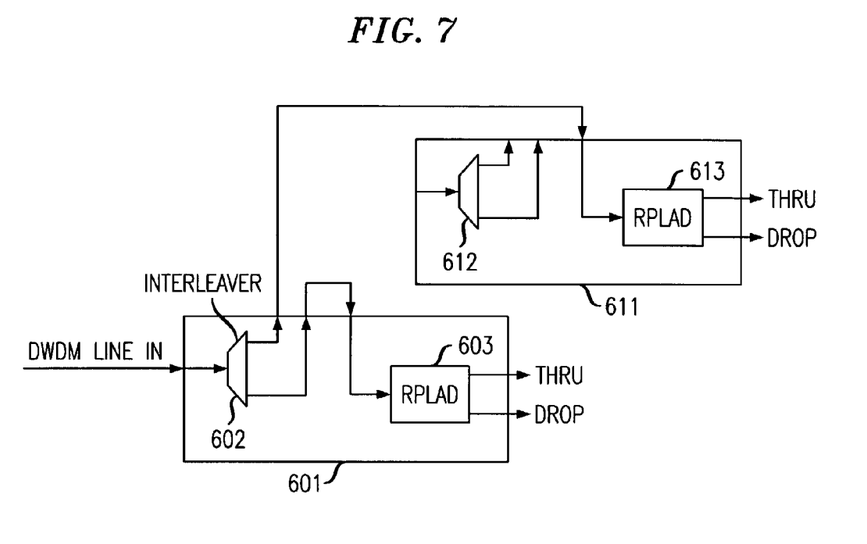
FIG. 7 is a diagram illustrating the manner in which the modularity and integratability of the present invention can be extended to include the entrance interleavers 110 and 111 of FIG. 2.

Referring now to FIG. 7, there is shown a diagram illustrating the manner in which the modularity and integrability of the present invention can be extended to include the entrance interleavers 110 and 111 of FIG. 2. In FIG. 7, a module 601 built on a single substrate includes both an RPLAD 603 and an interleaver 602. A similar arrangement of RPLAD 613 and an interleaver 612 is shown in a second, identical module 611. On each module, a WDM signal input to the interleaver is separated into multiple individual wavelength channels, and multiple outputs are available from the module, each containing one wavelength channel. In addition, in each module, the input and both through and drop outputs of the RPLAD are available. With this arrangement, each of the modules can advantageously serve different functions. For example, module 601 provides both interleaving and add/drop functionality, by routing some of the wavelength channels to RPLAD 603 and other of the wavelength channels to RPLAD 613 on module 611. By way of comparison, interleaver 612 on module 611 is not used, and that module provides only add/drop functionality. Although not shown in FIG. 7, it is to be noted that a similar approach can also be used with respect to egress interleavers 112 and 113 of FIG. 2.

Figure 8:
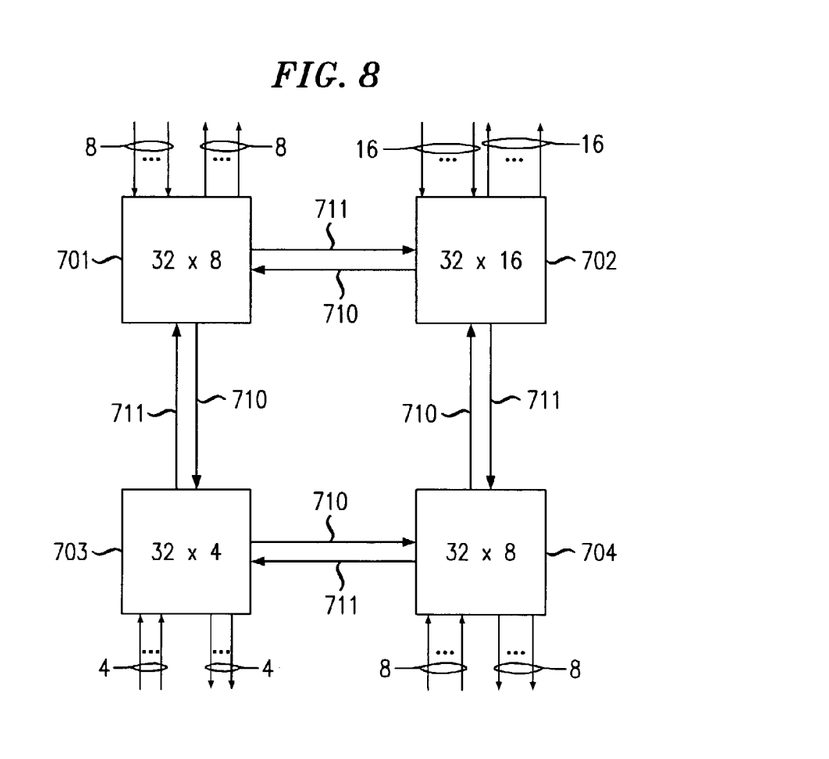
FIG. 8 is a diagram illustrating another aspect in which the present invention enables modular operation of a WDM communication system.

Referring now to FIG. 8, there is shown a diagram illustrating in more detail another aspect in which the present invention enables modular operation of a WDM communication system. In that figure, four nodes 701-704 are interconnected via two optical communications rings 711 and 712, the former operating in a CW direction and the latter operating in a CCW direction. Each of the nodes 701-704 is basically similar to the arrangement shown in FIGS. 1 and 2, except that each node is internally arranged to accommodate a different number of add/drop channels. More specifically, nodes 701 and 704 are illustratively each 32×8 nodes, meaning that (a) they are arranged to receive a 32 channel WDM signal, and (b) add/drop 8 WDM channels. To achieve this functionality, cross connects 105 and 148 would of course be 8×8 switches, eight VOA's 131, 151 would be provided, etc. By way of comparison, node 702 is illustratively a 32×16 node, meaning that (a) it is also arranged to receive a 32 channel WDM signal, but it is arranged to (b) add/drop 16 WDM channels. To achieve this functionality, cross connects 105 and 148 would of course be 16×16 switches, sixteen VOA's 131, 151 would be provided, etc. Node 703 is illustratively a 32×4 node, and is therefore arranged to handle 4 add/drop channels.

By virtue of the arrangement like that shown in FIG. 8, a network designer can easily select a node that has the appropriate capability for the site at which the node is to be used. For high traffic sites, larger nodes are employed, while for sites at which fewer channels are anticipated smaller nodes are sufficient.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. For example, additional elements can be integrated on the same substrate as those shown in the figures, and these elements can provide either additional functionality or additional capacity.

The invention claimed is:

1. A reconfigurable integrated planar lightwave add-drop (RPLAD) multiplexer having a plurality of add ports and a plurality of drop ports, said RPLAD arranged for use in a WDM optical communication system, said RPLAD comprising
   a cross-connect switch formed from an interconnected array of optical 1×2 switches,
   means for dropping a first plurality of WDM channels from an input WDM signal to desired ones of said plurality of drop ports by controlling said optical 1×2 switches forming said cross-connect switch,
   a passive optical power combiner having an output port and a plurality of input ports, wherein each input port is connected to a respective add port of the plurality of add ports;
   wherein a plurality of said RPLAD multiplexers are interconnected by dual transmission rings that operate in opposite directions; and wherein said drop ports each drop channels from the input WDM signal only on one of said transmission rings, and said add ports add channels via the passive power combiner, only to the other one of said transmission rings,
   such that the dropped channels are received at the RPLAD only from a prescribed direction only on one of the transmission rings, and the added channels are transmitted from the RPLAD back only toward said prescribed direction only on the other transmission ring.

2. The invention defined in claim 1 wherein said add ports each include a tunable laser.

3. The invention defined in claim 1 wherein said passive optical power combiner is a star coupler.

4. The invention defined in claim 1, wherein each of said RPLAD multiplexers is arranged to re-route incoming traffic from the one of said optical transmission rings to the other one of said optical transmission rings in the event of a failure of one of said RPLAD multiplexers.

5. The invention defined in claim 1 wherein each of said RPLAD multiplexers include a plurality of variable optical attenuators (VOA's) arranged to correct imbalances in the power levels present in said WDM channels.

6. The invention defined in claim 1 wherein said first plurality of WDM channels are dropped from said input WDM signal by an interleaver.

7. The invention defined in claim 6 wherein said interleaver is integrated on the same substrate as said switches.

8. In an optical communication system adapted to transmit a multiplexed signal containing a plurality of wavelength division multiplexed channels each channel having a different wavelength, an arrangement for a node served by dual transmission rings that operate in opposite directions, the node adapted to (a) receive at the node, an incoming multiplexed signal containing a first plurality of channels, (b) add one or more channels to a second incoming multiplexed signal, and (c) drop one or more channels from said incoming multiplexed signal, an integrated reconfigurable planar lightwave add-drop (RPLAD) multiplexer comprising:
   a plurality of add ports for receiving said one or more channels to be added to said second incoming multiplexed signal,
   a plurality of drop ports for receiving said one or more channels to be dropped from said incoming multiplexed signal that arrives only on one of the transmission rings,
   a cross-connect switch formed from an interconnected array of optical 1×2 switches for routing selected ones of said one or more channels to be dropped from said incoming multiplexed signal, to desired ones of said drop ports, and
   a wavelength independent passive optical power combiner having an output port and a plurality of input ports, the input ports for receiving from said add ports said one or more channels to be added, and for combining said one or more channels to said second incoming multiplexed signal that arrives only on the other one of the transmission rings;
   such that each of said channels to be dropped from said incoming multiplexed signal arrive at the node only from a prescribed direction, and said channels added to the second incoming multiplexed signal are transmitted back only toward said prescribed direction.

* * * * *